(12) United States Patent
Piesker

(10) Patent No.: US 8,079,194 B2
(45) Date of Patent: Dec. 20, 2011

(54) THERMAL INSULATING ELEMENT

(75) Inventor: Markus Piesker, Lueneberg (DE)

(73) Assignee: Airbus Deutschland GmbH, Hamburg (DE)

( * ) Notice: Subject to any disclaimer, the term of this patent is extended or adjusted under 35 U.S.C. 154(b) by 762 days.

(21) Appl. No.: 11/951,859

(22) Filed: Dec. 6, 2007

(65) Prior Publication Data

US 2008/0135683 A1    Jun. 12, 2008

Related U.S. Application Data

(60) Provisional application No. 60/869,125, filed on Dec. 8, 2006.

(30) Foreign Application Priority Data

Dec. 8, 2006 (DE) .......................... 10 2006 058 005

(51) Int. Cl.
E04D 1/00 (2006.01)

(52) U.S. Cl. .......................... 52/558; 52/583.1; 52/592.6

(58) Field of Classification Search .................... 52/558, 52/415, 583.1, 592.6, 407.1, 407.3, 407.5, 52/145

See application file for complete search history.

(56) References Cited

U.S. PATENT DOCUMENTS

| | | | |
|---|---|---|---|
| 1,992,509 A * | 2/1935 | Slidell | 52/145 |
| 1,998,425 A * | 4/1935 | McNeil | 52/145 |
| 2,028,253 A * | 1/1936 | Spafford | 428/126 |
| 2,742,385 A * | 4/1956 | Bovenkerk | 428/74 |
| 3,249,659 A | 5/1966 | Voelker | |
| 3,364,639 A | 1/1968 | Davenport | |
| 4,080,235 A * | 3/1978 | Mandersson | 156/218 |
| 4,172,345 A * | 10/1979 | Alderman | 52/406.2 |
| 5,277,955 A * | 1/1994 | Schelhorn et al. | 428/74 |
| 7,703,254 B2 * | 4/2010 | Alderman | 52/506.07 |
| 2004/0163345 A1* | 8/2004 | Alderman | 52/404.1 |

FOREIGN PATENT DOCUMENTS

| | | |
|---|---|---|
| DE | 7238992 | 6/1973 |
| DE | 29714251 | 1/1998 |
| DE | 102004014248 | 10/2005 |
| FR | 2628179 | 9/1989 |

* cited by examiner

Primary Examiner — Basil Katcheves

(74) Attorney, Agent, or Firm — Wood, Herron & Evans, LLP

(57) ABSTRACT

A thermal insulating element (10'; 10''') comprises a first plate (24) forming at least a part of an outer face of the insulating element (10'; 10''') and a second plate (26) forming a further part of the outer face of the insulating element (10'; 10'''). The first and the second plate (24, 26) are connected to each other via a frame structure (12) which establishes a geometry of the insulating element (10'; 10'''). The first and the second plate (24, 26) and the frame structure (12) define a cavity filled with air, wherein at least one vent opening (28) is formed in the first and/or the second plate (24, 26) and/or the frame structure (12). A projecting edge portion (34, 36) is formed along an edge of a portion of the insulating element (10'; 10''') which is provided with the at least one vent opening (28), the projecting edge portion (34, 36) being adapted to at least partially cover a gap between two insulating elements (10'; 10''') disposed side by side.

20 Claims, 6 Drawing Sheets

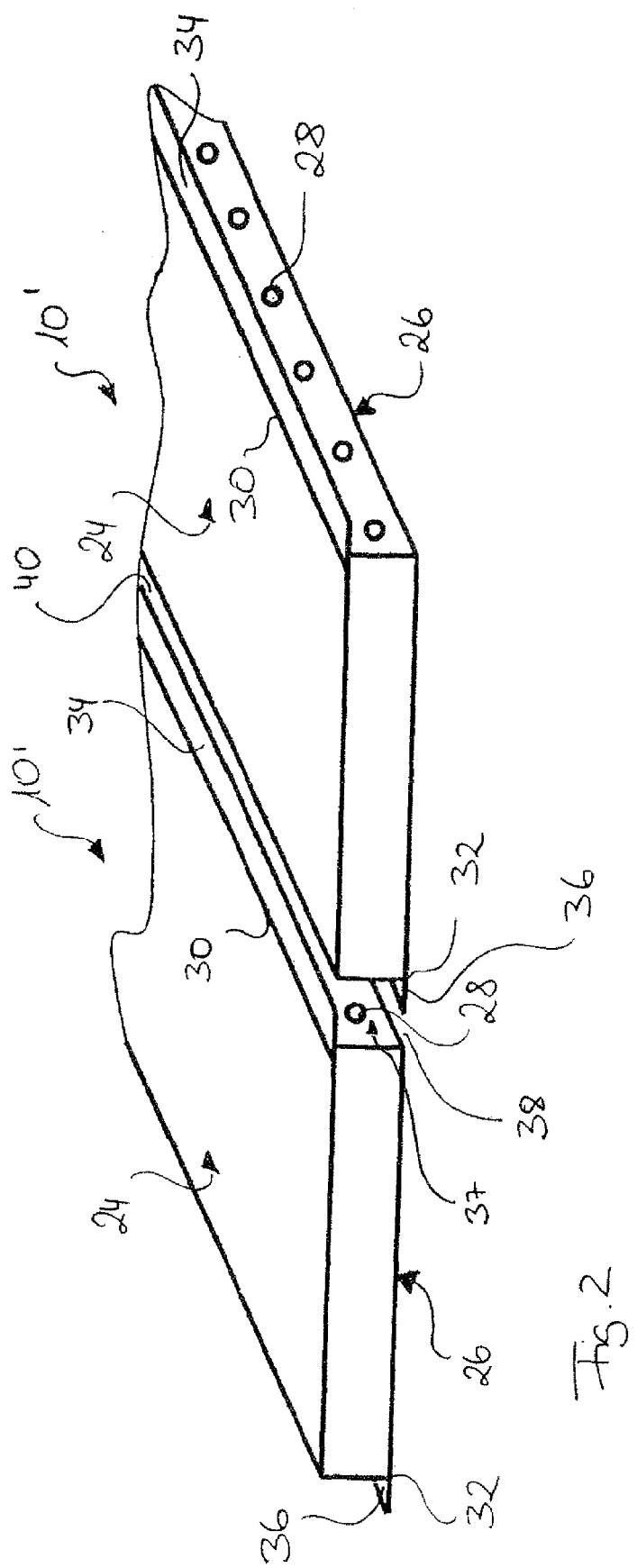

THERMAL INSULATING ELEMENT

TECHNICAL FIELD

The present invention relates to a thermal insulating element which is in particular suitable for use in an aircraft as well as a thermal insulating system which is in particular suitable for use in an aircraft.

BACKGROUND

A large number of structural or system components which must be protected against elevated temperatures in order to guarantee proper operational reliability are found on board an aircraft. Components which emit heat must therefore usually be thermally insulated in order for the structural or system components in the heat-affected zone to remain functional. It is also necessary to protect on-board system components which are relevant to flight safety against the thermal effects of a fire is on board the aircraft through appropriate constructional measures. Furthermore, it may be advisable to thermally insulate heat-emitting on-board system components, in particular in aircraft which are used for military purposes, in order to prevent the emission of a thermal signature which would enable the aircraft to be identified or located.

The transmission of thermal energy from a thermal energy source at an elevated temperature level to the environment takes place through heat conduction, heat radiation and convection. The object of conventional insulating elements is to reduce the heat conduction between the thermal energy source and the environment. Temperature equalisation between the thermal energy source and the environment, which occurs as a result of a heat flow emitted from the thermal energy source to the environment, is thereby prevented or at least delayed in time. Conventional insulating elements therefore usually comprise materials of a low thermal conductivity such as, e.g. air, mineral fibres, foam materials or the like. The low thermal conductivity of the insulating materials reduces the heat conduction between the thermal energy source and the environment, so that sensitive components which are disposed in the environment of the thermal energy source can be protected against the elevated temperature of the thermal energy source.

However, the use of conventional insulating elements in an aircraft has a number of disadvantages. On the one hand, only certain insulating materials are suitable for use on board an aircraft with regard to their insulating properties. For example, the insulating effect of air is frequently not sufficient to fulfill the requirements to be met by an insulating material in a special aircraft application. Moreover, the use of insulating elements comprising an insulating material inevitably results in an increased weight which, for example, must be additionally carried by the aircraft structure, which is designed for high accelerations. On the other hand, the insulating materials which are used in conventional insulating elements may suck up fluids such as, e.g. fuel or de-icing fluid, which must be taken into account in the design and maintenance. Finally, the insulating material of conventional insulating elements may undergo local segregation due to vibrations which occur in particular during flight and as a result lose its insulating capability.

DE 296 14 251 U1 discloses an insulating element with a layered structure which comprises two opposing cover layers and an intermediate layer disposed between the cover layers. The intermediate layer comprises a granulate material, wherein vent openings are provided in the intermediate layer.

DE 7238992 U1 discloses the manufacturing of housings or housing parts for example sidewalls, bottom plates, ceiling plates or covers of sound dampening and insulating layered plates. If needed, the layered plates can be provided with vent openings.

U.S. Pat. No. 3,364,639 relates to an insulating panel comprising an outer housing, an inner housing as well as a fiber core disposed within the inner housing. The inner housing is formed and disposed in the outer housing such that a free space is provided between the inner housing and the outer housing.

U.S. Pat. No. 3,249,659 relates to a panel having a honeycomb structure and two opposing foam plates defining a space therebetween which is interrupted by supporting elements of the honeycomb structure. Outer faces of the foam plates are covered with a layer made of paper, glass fiber material, metal foil or plastics.

DE 10 2004 014 248 A1 discloses a low pressure insulating panel which is made of a self supporting, stable material having a low heat conductivity. The panel is evacuated by means of a vacuum pump and maintained at a predetermined low pressure by means of a controller.

The object of the present invention is to provide a thermal insulating element having a good insulating effect and a low weight which is in particular suitable for use in an aircraft.

This object is solved by a thermal insulating element having the features described below.

SUMMARY

A thermal insulating element according to the invention which is in particular suitable for use in an aircraft comprises a frame structure which establishes a geometry of the insulating element. The frame structure of the insulating element according to the invention can establish any desired geometry. The geometry of the insulating element is preferably given a three-dimensional contour in order to adapt the shape of the insulating element to the surrounding construction space, for example. The insulating element can have a plate-shaped or a cuboid geometry, for example. However, it is also possible to construct the thermal insulating element with a curved contour in order to adapt the geometry of the insulating element to a curvature of an aircraft fuselage, for example.

The frame structure of the thermal insulating element according to the invention serves to give the insulating element the required inherent mechanical stability. The specific design of the frame structure is therefore adapted to the mechanical loads acting on the thermal insulating element in a specific application. The material which is used to produce the frame structure is similarly selected in dependence on the mechanical loads to which the insulating element and therefore the frame structure is subjected in a specific application. For example, the frame structure can consist of a metallic material such as, e.g. steel, aluminium or an aluminium alloy or titanium or a titanium alloy. However, the frame structure can also consist of a carbon fibre material, which is distinguished by high mechanical strength and a low weight, or a suitable plastics material.

The thermal insulating element according to the invention also comprises a first plate forming a part of an outer face of the insulating element which, via the frame structure, is connected to a second plate forming a further part of the outer face of the insulating element. The first and/or the second plate can be applied to flat portions of the frame structure, so that the outer face of the first and/or the second plate forms the outer face of the insulating element in the region of these flat frame structure portions. However, the first and/or the second plate can also be supported by the frame structure so that parts of the outer face of the insulating element are formed by the outer face of a first and/or a second plate which is supported at the frame structure just at its edges, for example. The first and/or the second plate can be connected to the frame structure by any suitable joining method. For example, the first and/or the second plate can be stuck, welded or soldered to the frame structure. The thermal insulating element according to the invention may also comprise further plates each forming a part of an outer face of the insulating element.

Finally, the thermal insulating element according to the invention has at least one vent opening. The vent opening can be formed in a flat portion of the frame structure and/or in the plates which are connected to the frame structure. The important factor is for the vent opening to enable air to be fed into the interior of the insulating element and air to be removed from the interior of the insulating element.

As opposed to conventional insulating elements, the object of which is to reduce the heat conduction between a thermal energy source and the environment, the operating principle of the thermal insulating element according to the invention utilises the physical effects of the heat radiation and the convection in order, for example, to protect temperature-sensitive components disposed in the vicinity of a thermal energy source against the elevated temperature of the thermal energy source. In the case of the thermal insulating element according to the invention the plates, the outer face of which forms at least a part of the outer face of the insulating element, serve as a shield against the heat radiation which is emitted from the thermal energy source. In this respect the plates as well as the air in the interior of the insulating element heat up. As there is a density gradient between warm and cold air, an air movement called free convection results, i.e. an air exchange between the air in the interior of the insulating element and the outside air. This air exchange takes place through the vent opening which is formed in the insulating element and removes heat from the interior of the insulating element. The plates are at the same time cooled on both sides through the free convection.

The thermal insulating element according to the invention is distinguished by a good insulating effect and a particularly low weight. The mechanical properties of the insulating element can easily be adapted to the mechanical loads which act on the insulating element in a specific application by configuring the frame structure accordingly. The use of conventional insulating materials such as, e.g. mineral fibres, foam materials or the like, is reduced or avoided in the insulating element according to the invention. A loss of insulating capability during the life of the insulating element, which is caused in conventional insulating elements by local segregation of the insulating material, can therefore be reliably excluded in the case of the insulating element according to the invention. Finally, the thermal insulating element according to the invention affords advantages in terms of safety, as it contains no insulating materials which could suck up fluids such as, e.g. fuel or de-icing fluid.

The thermal insulating element according to the invention can, for example, be used to insulate an aircraft outer skin and/or an aircraft structure against the thermal effects of a fire inside a firewall of the auxiliary power unit (APU) or the main power unit of the aircraft.

In an embodiment of the thermal insulating element according to the invention the frame structure comprises a plurality of frame elements which establish the geometry of the insulating element. The frame elements may, for example, be formed in the shape of rods. A design of this kind of the frame structure is appropriate if the insulating element is only subjected to relatively low mechanical loads and is distinguished by a particularly low weight. However, it is also possible to use frame is elements with a rectangular cross section.

The frame structure can also be configured so that it establishes a circumferential surface of a three-dimensional geometry of the insulating element. For example, a frame structure in the case of a cuboid insulating element can comprise the four side faces of the cuboid which form the circumferential surface of the cuboid. Additional frame structure elements can be provided, depending on the mechanical requirements to be met by the thermal insulating element. For example, a frame structure which comprises a plurality of rod-shaped frame elements or frame elements which establish a circumferential surface of a three-dimensional geometry of the insulating element can comprise additional frame elements which support the at least one plate. A frame structure which establishes a circumferential surface of the three-dimensional geometry of the insulating element can in particular be supplemented by frame structure elements which are disposed substantially parallel to portions of the circumferential surface.

In a preferred embodiment of the thermal insulating element according to the invention a frame element of the frame structure is formed in one piece with the first and/or the second plate. If desired, a plurality of or all frame elements of the frame structure can be formed in one piece with the at least one plate. The insulating element can then be produced easily and inexpensively.

For example, the frame structure can comprise at least one frame element extending substantially perpendicularly from the first plate. It is preferable for two frame elements to extend substantially perpendicularly from the first plate. A component which forms the first plate and the frame elements then has, for example, a U-shaped cross section and can be produced particularly easily.

The frame structure can additionally or alternatively also comprise at least one frame element extending substantially perpendicularly from the second plate. It is preferable for two frame elements to extend substantially perpendicularly from the second plate. A component which forms the second plate and the frame elements then likewise has, for example, a U-shaped cross section. For example, the first and the second plates with the frame elements attached to the plates or formed in one piece therewith can be connected to form a cuboid insulating element.

The first and/or the second plate of the thermal insulating element according to the invention is/are preferably formed by a foil. The insulating element can then be of a particularly low weight.

In a preferred embodiment of the thermal insulating element according to the invention the entire outer face of the insulating element is formed by the outer face of a plurality of plates. This renders production particularly easy.

Depending on the desired insulating effect, the first and/or the second plate can comprise a plurality of material layers disposed one above the other. The material layers of the plate(s) can consist of the same material or of different materials. The material layers can, for example, be connected together by sticking, welding or soldering or loosely stacked one above the other.

The first and/or the second plate preferably has/have an outer face which reflects heat radiation. A plate with an outer face which reflects heat radiation affords a particularly good shield against heat radiation which is emitted from a thermal energy source. The plate(s) can consist as a whole of a material which reflects heat radiation. However, it is alternatively also possible to provide the plate(s) with a surface coating which reflects heat radiation. The outer face of the plate(s) and an inner face of the plate(s) which faces the interior of the thermal insulating element can have the same thermal properties. However, it is alternatively also conceivable to provide the thermal insulating element according to the invention with a first and/or a second plate whose outer face has thermal properties different to those of its inner face.

In a preferred configuration of the thermal insulating element according to the invention the outer face of the first and/or the second plate is provided with a surface structure. For example, a knob structure or a similar surface structure can be formed on the outer face of the plate(s). The surface structure present on the outer face of the plate(s) causes the heat radiation acting on the plate(s) to scatter and as a result improves the insulating effect of the insulating element. Preferably, the surface structure is formed so as to reinforce and/or stabilize the first and/or the second plate. A reinforcing/stabilizing surface structure is in particular advantageous when the first and/or the second plate consist(s) of a metal foil.

The first and/or the second plate of the thermal insulating element according to the invention can consist of steel, a carbon fibre material, a plastics material, aluminium or titanium. The material of the plate(s) can advantageously be selected in dependence on the requirements to be met by the insulating element according to the invention in a respective application. A steel plate is distinguished, for example, by excellent thermal stability and good reflection properties. A plate consisting of a carbon fibre material enables a particularly lightweight insulating element to be produced. An aluminium plate is inexpensive to produce and to process and can, for example, be used if the thermal load acting on the insulating element is appropriately low. Titanium is distinguished by excellent thermal and mechanical properties and enables a lightweight insulating element to be produced. However a titanium plate is relatively expensive.

An insulating material is preferably applied to the first and/or the second plate and/or the frame structure of the thermal insulating element according to the invention in order to improve the insulating properties of the insulating element. The insulating material which is used can be any conventional insulating material. The insulating material can also be applied in the form of a coating to the first and/or the second plate and/or the frame structure of the thermal insulating element according to the invention.

A preferred embodiment of the thermal insulating element according to the invention comprises a plurality of vent openings. This promotes the free convection, so that a particularly efficient exchange between the air in the interior of the insulating element and the outside air becomes possible. The vent openings can, for example, be formed in faces of the insulating element which lie opposite one another. If the insulating element is of a cuboid configuration, the vent openings can be provided, for example, in side faces of the cuboid insulating element which lie opposite one another. The vent openings can be formed in a flat portion of the frame structure and/or in the first and/or the second plate which is connected to the frame structure.

A projecting edge portion is formed along at least one edge of the insulating element. The projecting edge portion can extend substantially parallel to an adjacent plate of the insulating element and be formed either by the material of the frame structure or the plate which is connected to the frame structure. It is alternatively also conceivable for the projecting edge portion to form a part of the frame structure and be covered with a foil which forms the plate. As a further alternative, the projecting edge portion can also be formed as a separate component and be attached to one of the plates and/or the frame portion of the insulating element. The projecting edge portion of the insulating element according to the invention advantageously serves to at least partially cover a gap between two insulating elements disposed side by side.

The projecting edge portion can for example be formed of a thermal resistant plastics material, for example a silicone elastomeric material. When the projecting edge portion consists of a plastics material or another material having some resilience, the projecting edge portion can be somewhat compressed so as to fit to the respective width of the gap between two insulating elements disposed side by side. When the projecting edge portion is formed of a material which has some resilience, the gap thus can be completely covered by a single projecting edge portion. Furthermore, when the projecting edge portion is formed of a plastics material or another suitable material which e.g. has some resilience, a contact between metallic parts of the insulating elements upon installation of the insulating elements can be prevented.

If a plurality of insulating elements are disposed side by side, a restriction of the free convection through and between the insulating elements should be avoided. The gaps provided between the insulating elements allow to obtain efficient free convection through the gaps and, as a result, between and through the insulating elements. An optimum shield against the heat radiation which is emitted from a thermal energy source is at the same time guaranteed by the projecting edge portions of the insulating elements.

As already indicated above, a gap between two insulating elements disposed side by side can be covered by a single projecting edge portion formed along an edge of one of the insulating elements. Alternatively, it is also conceivable for the gap between the two insulating elements disposed side by side to be covered by two projecting edge portions formed along edges of the insulating elements facing each other so that the projecting edge portions extend substantially in the same plane. When the gap provided between two insulating elements disposed side by side is completely covered by only one projecting edge portion or projecting edge portions which extends substantially in the same plane, the projecting edge portion(s) is/are preferably formed along an edge/edges of the insulating element(s) facing the thermal energy source. As a result, efficient free convection through the gap can be maintained and, at the same time, an optimum shield effect can be achieved.

Alternatively, a gap provided between two insulating elements disposed side by side can also be covered on two sides, i.e. on a side facing the thermal energy source and on a side facing away from the thermal energy source, by corresponding projecting edge portions formed on one or both of the insulating elements. When the gap is is covered on two sides, the projecting edge portions, however, preferably do not cover the entire gap width but are formed so as to maintain a free space between the projecting edge portions and the adjacent insulating element. This allows to maintain efficient free convection through and between the insulating elements. To nevertheless obtain an optimum shield effect against the heat radiation emitted from the thermal energy source, the free spaces maintained between the projecting edge portions and the adjacent insulating element preferably are provided along diagonal opposite edges of the gap.

To allow a gap provided between two insulating elements disposed side by side to be covered on two sides, one insulating element may be provided with two projecting edge portions. Alternatively, one projecting edge portion may be formed along an edge of one of the insulating element and another projecting edge portion may be formed along an edge of the other insulating element.

A particularly preferred embodiment of a thermal insulating element according to the invention therefore has two projecting edge portions which extend along two edges of the insulating element which lie diagonally opposite one another. When installing two insulating elements formed in this way, a gap existing between these two insulating elements can easily be at least partially covered on both sides by the corresponding projecting edge portions of the two insulating elements.

The insulating element according to the invention is preferably configured so that the frame structure and/or the plate connected to the frame structure can be cooled on both sides through free convection.

Preferably the insulating element according to the invention comprises a plurality of plates, i.e. the first plate, the second plate and at least one intermediate plate. The plates are preferably stacked on top of each other so as to define air filled chambers therebetween. The plates can consist of the same material or of different materials. For example, the first and the second plate forming parts of the outer face of the insulating element can consist of a first material and the at least one intermediate plate can consist of a different material. It is, however, also possible to select different materials for all of the plates. Each of the plates scatters heat radiation and on both sides of each plate the heat is removed through free convection. A thermal insulating system according to the invention which is in particular suitable is for use in an aircraft comprises a plurality of the insulating elements described above. A large area can be thermally insulated in an efficient manner by means of the insulating system. In the thermal insulating system according to the invention preferably thin plate shaped insulating elements which, for example, are made of a metallic foil are used, wherein the thermal insulating system according to the invention is designed as lightweight as possible with as few fastening devices and reinforcement devices as possible.

In the thermal insulating system according to the invention, which comprises a plurality of insulating elements, each insulating element preferably is designed in the form of a closed box so as to provide for a particularly high mechanical stability. The mechanical stability of an individual insulating element increases with decreasing size of the insulating element. The size of the individual insulating elements in a thermal insulating system according to the invention therefore preferably is adapted to the loads and the accelerations the insulating elements are subjected to in use.

The weight of the thermal insulating system according to the invention can be optimized by selecting an appropriate number of individual insulating elements, appropriate thicknesses of the plates of the individual insulating elements and/or, an appropriate size of the individual insulating elements. Upon selecting an appropriate size of the individual insulating elements vibrations acting on the insulating elements when used on board an aircraft should be considered. Preferably, the size of the individual insulating elements is selected such that a resonant frequency of the insulating elements is different from the frequency of vibrations which are typically induced on board an aircraft, for example by the aircraft's power units.

Free convection through the insulating elements of a thermal insulating system according to the invention can be ensured independent of the position of the individual insulating elements. When the insulating elements are heated by means of a thermal energy source, a free flow of air is generated within the insulating elements. Due to this free flow cooler air is drawn into the insulating elements, for example from the gap provided between two insulating elements disposed side by side. The air heated within the insulating elements flows into the gap provided between two insulating elements disposed side by side and from the gap to the outside or through an adjacent insulating element. The air which is moved by free convection can also flow through all insulating elements of the insulating system if only one insulating element of the system is subjected to the thermal energy emitted is from the thermal energy source.

BRIEF DESCRIPTION OF THE DRAWINGS

Preferred embodiments of a thermal insulating element according to the invention are illustrated in detail on the basis of the accompanying schematic figures, of which:

FIG. 1b shows a frame structure of the thermal insulating element which is represented in FIG. 1a.

FIG. 2 shows two thermal insulating elements according to the invention which are disposed side by side.

DETAILED DESCRIPTION

Figure 1A:
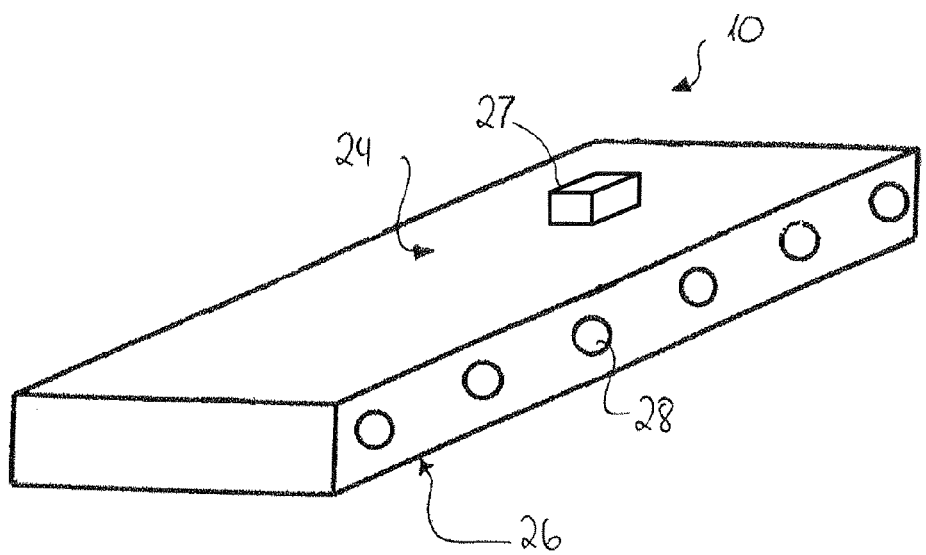
FIG. 1a shows a thermal insulating element.
Figure 1B:
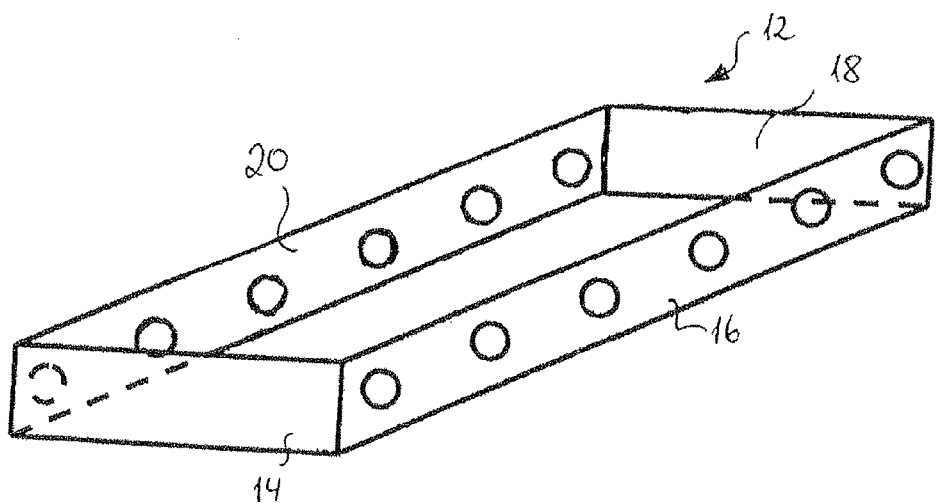

FIG. 1a shows a thermal insulating element 10 which is in particular suitable for use in an aircraft. As can best be seen in FIG. 1b, the insulating element 10 comprises a frame structure 12 which establishes a cuboid geometry of the insulating element 10. The frame structure 12 comprises four plate-shaped frame elements 14, 16, 18, 20 which adjoin one another and are connected together. The frame elements 14, 16, 18, 20 form a circumferential surface of the cuboid insulating element 10. Depending on the mechanical load acting on the insulating element 10, it may be possible to dispense with the frame elements 14, 18.

Parts of an outer face of the insulating element 10 are formed by outer faces of two plates 24, 26 which are connected to the frame structure 12. The plates 24, 26 are connected to the frame elements 14, 16, 18, 20 by welding or sticking and are supported at the frame elements 14, 16, 18, 20 of the frame structure 12 at their edges.

The plates 24, 26 consist of steel and therefore have an outer face which reflects heat radiation. The outer faces of the plates 24, 26 are also provided with a knob-shaped surface structure 27 (shown schematically in FIG. 1a), whereby the scattering of heat radiation from the outer face of the plates 24, 26 is augmented. In the embodiment of a thermal insulating element 10 which is shown in FIG. 1a the plates 24, 26 consist of a steel foil with only one material layer. However, the plates 24, 26 can alternatively also comprise a plurality of material layers disposed one above the other, wherein the material layers can consist of the same material or of different materials.

A plurality of vent openings 28 is formed in the frame elements 16, 20 of the frame structure 12 which lie opposite one another. However, it is alternatively or additionally also possible to provide the frame elements 14, 18 with a desired number of vent openings.

If the insulating element 10 is subjected to heat radiation emitted from a thermal energy source, some of the heat radiation emitted from the thermal energy source is reflected and scattered from the outer face of the plates 24, 26. The remainder of the heat radiation emitted from the thermal energy source heats the air in the interior of the insulating element 10. A density gradient between the heated air in the interior of the insulating element 10 and cool outside air gives rise to free convection and therefore an exchange taking placing through the vent openings 28 between the warm air in the interior of the insulating element 10 and the cool outside air. The free convection therefore effects the removal of heat from the interior of the insulating element 10 and at the same time causes the plates 24, 26 and the frame structure 12 to be cooled on both sides.

The insulating elements 10' which are shown in FIG. 2 differ from the insulating element 10 which is represented in FIG. 1a in that they comprise a projecting edge portion 34, 36 along two edges 30, 32 which lie diagonally opposite one another. The projecting edge portions 34, 36 extend substantially parallel to the plates 24, 26 of the insulating elements 10' and are formed by a portion of the plates 24, 26. However, it would alternatively also be possible to form the projecting edge portions 34, 36 by an element of the frame structure 12. As can be seen from FIG. 2, the edge portions 34, 36 enable a gap 37 existing between the two insulating elements 10' to be covered on both sides, wherein a free space 38, 40 is maintained between the edge portions 34, 36 and the adjacent insulating element 10'.

Figure 3:
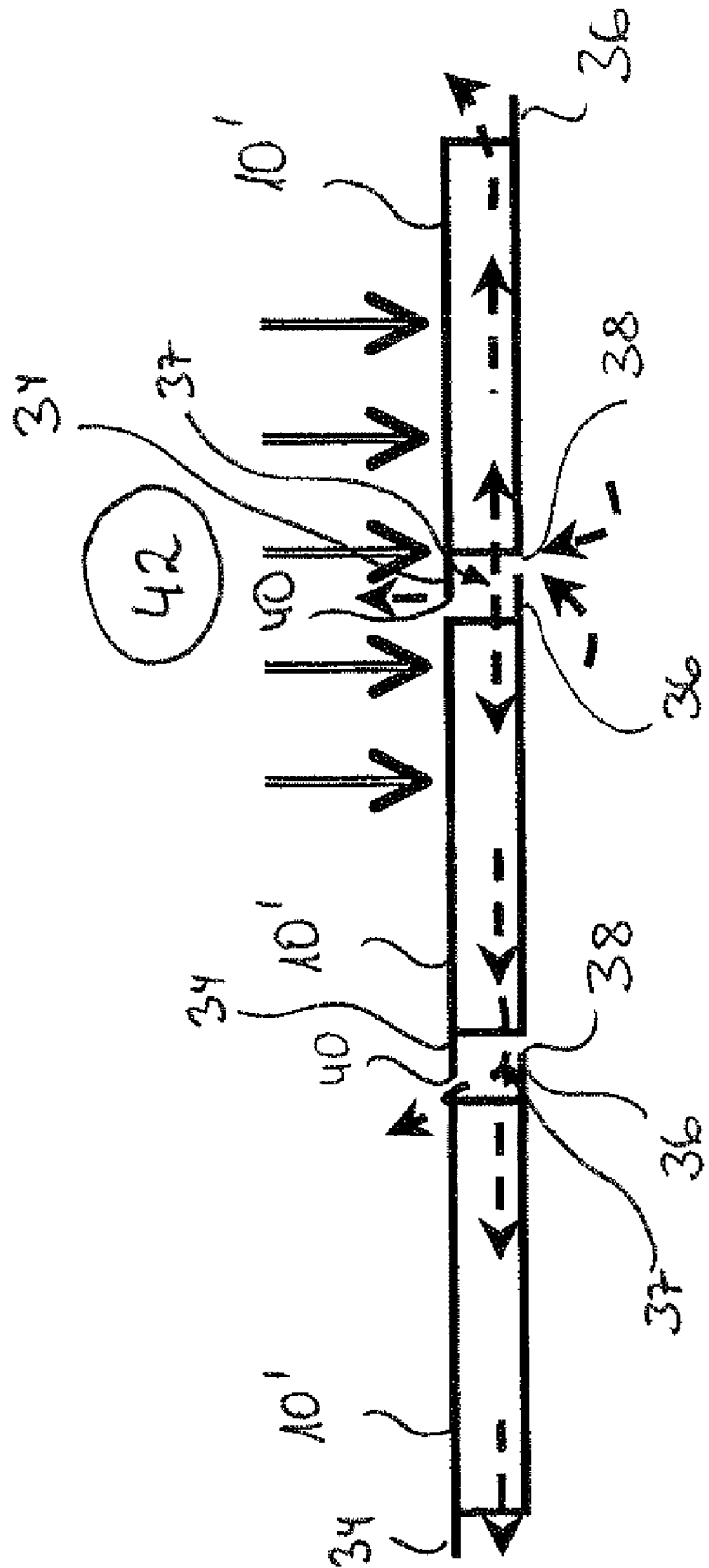
FIG. 3 shows the operating principle of an arrangement comprising three thermal insulating elements according to the invention.

As becomes apparent from FIG. 3, heat emitted by a thermal energy source 42 heats the air within the thermal insulating elements 10'. As a result a free airflow is generated within the thermal insulating elements 10' which causes cooler air from the gaps 37 between the thermal insulating elements 10' to be drawn into the thermal insulating elements 10', whereas the heated air exits the thermal insulating elements 10' through the vent openings 28 and flows either through the free space 38, 40 maintained between the edge portions 34, 36 and the adjacent insulating elements 10' to the outside or through adjacent insulating elements 10'.

As a result, an optimum shield effect against heat radiation which is emitted from the thermal energy source 42 can be obtained also in the region of the gaps 37 between the insulating elements 10'. The gaps 37 and the free space 38, 40 maintained between the edge portions 34, 36 and the adjacent insulating element 10' at the same time guarantee unimpeded free convection and therefore optimum air exchange between the warm air in the interior of the insulating elements 10' and the cool outside air.

Figure 4:
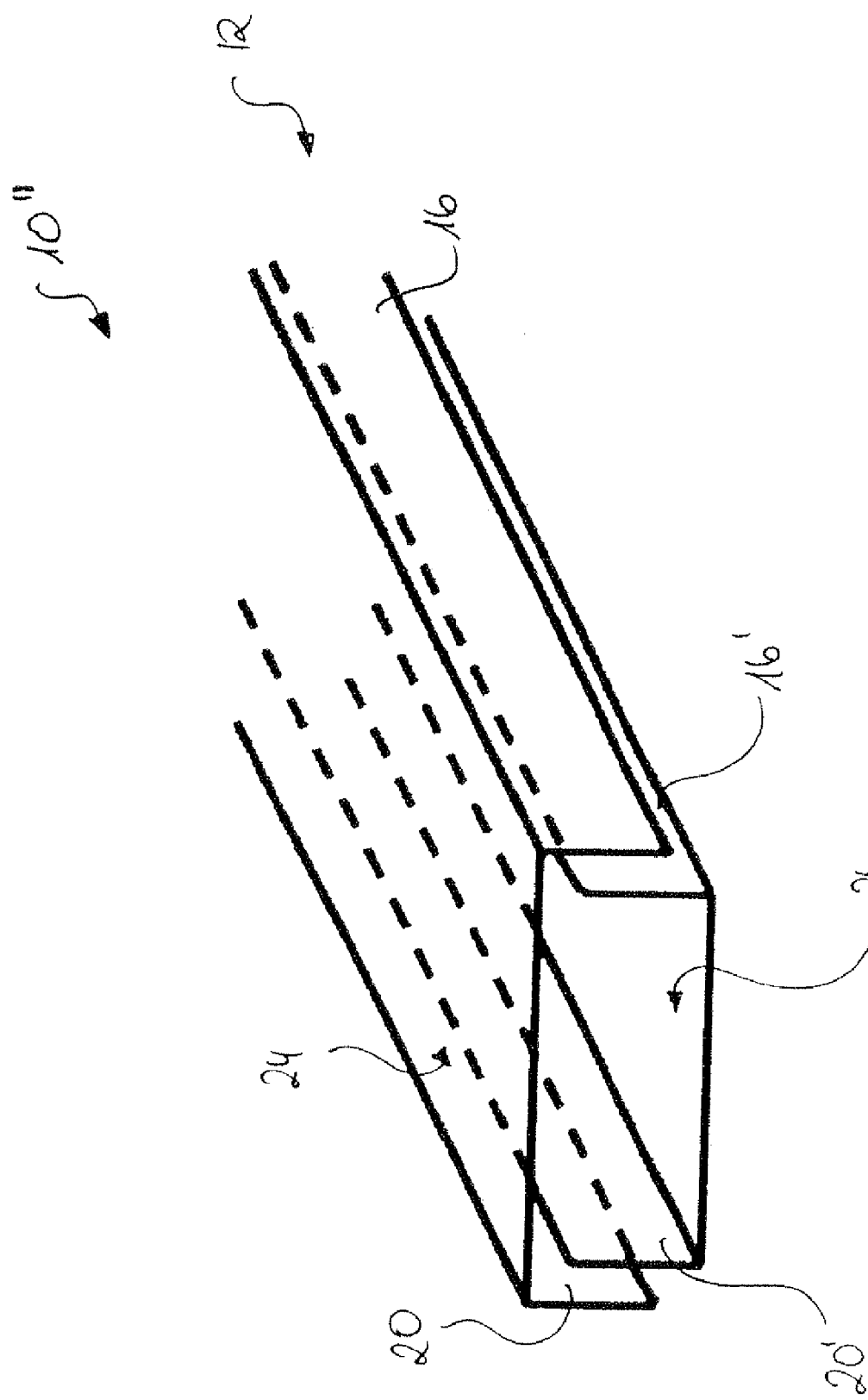
FIG. 4 shows a further thermal insulating element.

The insulating element 10'' which is shown in FIG. 4 comprises two plates 24, 26 formed by a steel foil. Frame elements 16, 16', 20, 20' of the frame structure 12 are formed in one piece with the plates 24, 26 and extend substantially perpendicularly from the plates 24, 26, so that components which form the plates 24, 26 and the frame elements 16, 16', 20, 20' have a U-shaped cross section. The plates 24, 26 with the frame elements 16, 16', 20, 20' are connected each other by sticking or welding.

Vent openings, which are not shown in FIG. 4, can be formed in the frame elements 16, 16', 20, 20'. Moreover, the end faces of the insulating element 10'' can be formed by further plates or frame elements of the frame structure 12. Further vent openings can also be formed in these plates or frame elements.

Figure 5:
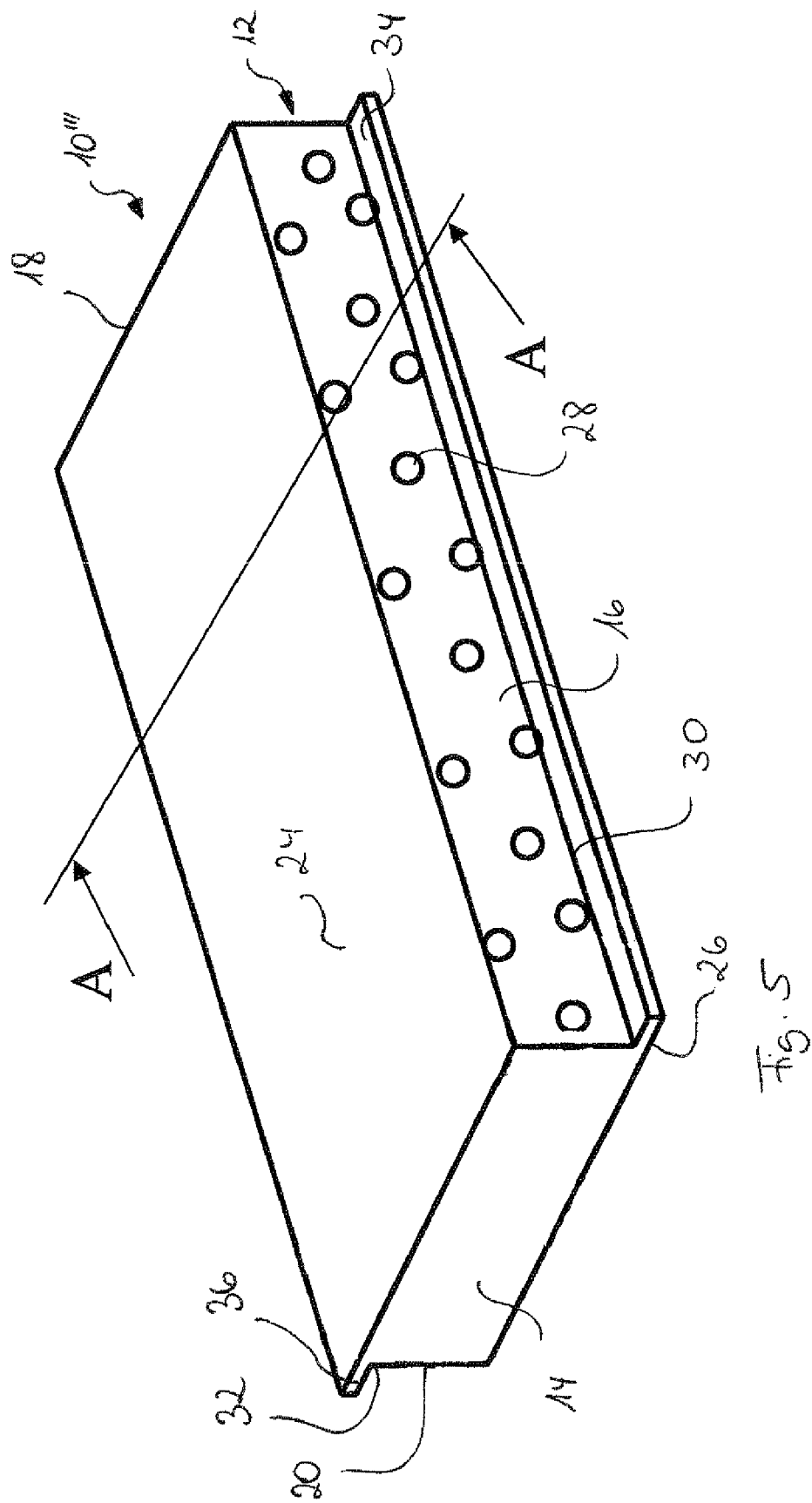
FIG. 5 shows a further thermal insulating element according to the invention.
Figure 6:
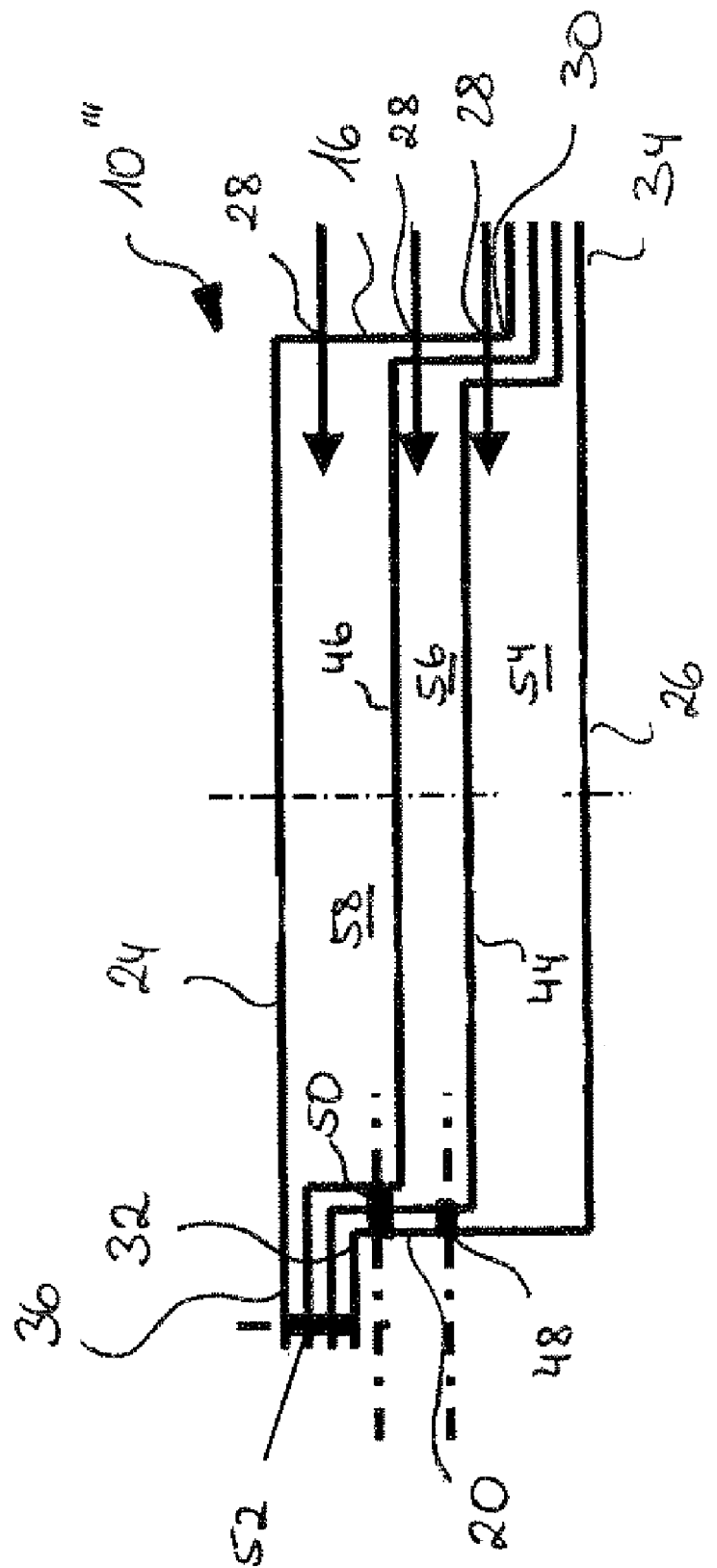
FIG. 6 shows a sectional view of the thermal insulating element which is represented in FIG. 5 along the line A-A.

The insulating element 10''' shown in FIGS. 5 and 6 has an outer contour which is quite similar to the outer contour of the insulating elements 101 represented in FIG. 2. In particular, the insulating element 10''', like the insulating elements 10', comprises a projecting edge portion 34, 36 along two edges 30, 32 which are disposed diagonally opposite one another. As becomes apparent from FIG. 6, the insulating element 10''', however, contrary to the insulating element 10', is defined by four appropriately formed components which are stacked on top of each other such that the insulating element 10''' comprises two outer plates 24, 26 and four plate-shaped frame elements 14, 16, 18, 20 defining a frame structure 12. Intermediate plates 44, 46 are arranged between the outer plates 24, 26.

The four components constituting the insulating element 10''' are made of metallic foil. The two components defining the outer plates 24, 26 are identical and the two components defining the intermediate plates 44, 46 are identical. The four components are connected to each other by means of first, second and third joints 48, 50, 52. For the sake of clarity, in FIG. 6 the first, second and third joints 48, 50, 52 are only indicated on the left side of the insulating element 10''' It should, however, be understood, that corresponding first, second and third joints can be provided also on the right side of the insulating element 10''' at corresponding positions, if needed. The first, second and third joints 48, 50, 52 can be point welded joints, seam welded joints or soldered joints.

The outer plates 24, 26 and the intermediate plates 44, 46 define three parallel chambers 54, 56, 58 within the interior of the thermal insulating element 10'''. Each chamber 54, 56, 58 is provided with a respective row of vent openings 28. For the sake of clarity, in FIG. 6 only the frame element 16 on the right side of the insulating element 10''' is provided with vent openings 28. It should, however, be understood that additional three rows of vent openings 28 can be formed in the frame element 20 on the left side of the insulating element 10'''.

Each plate 24, 26, 44, 46 reflects and dissipates heat radiation. The thermal insulating element 10''' thus acts as a multilayered shield against heat radiation, wherein the removal of heat from the insulating element 10''' is promoted by free convection. In the insulating element 10''' effective free convection can be obtained and thus the insulating effect of the insulating element 10'''. is enhance as compared to honeycomb structures comprising small cavities or structures comprising an insulating material which absorbs but not reflects heat radiation.

The invention claimed is:

1. An aircraft including a thermal insulating element configured to thermally insulate a device, the thermal insulating element comprising:
   a first plate forming at least a part of an outer face of the insulating element;
   a second plate forming a further part of the outer face of the insulating element;
   a frame structure coupled to the first plate and the second plate, the frame structure including a plurality of frame elements establishing a geometry of the insulating element and coupled to one another to define a closed circumferential surface between the first plate and the second plate, wherein the first plate, the second plate, and the frame structure collectively define a cavity filled with air;
   at least one vent opening formed in one or more of the first plate, the second plate, and the frame structure, the at least one vent opening communicating with the cavity filled with air so as to provide free convection by air exchange through the at least one vent opening when the air in the cavity is heated by the device thermally insulated by the thermal insulating element; and a projecting edge portion formed along an edge of a portion of the insulating element which is provided with the at least one vent opening, the projecting edge portion being adapted to at least partially cover a gap between two insulating elements disposed side by side in the aircraft.

2. The aircraft according to claim 1, wherein the plurality of frame elements which establish the geometry of the insulating element includes two opposing frame elements with at least one vent opening and at least two additional frame elements coupled to the two opposing frame elements.

3. The aircraft according to claim 1, wherein a frame element of the frame structure is formed in one piece with the first plate and/or the second plate.

4. The aircraft according to claim 3, wherein the frame structure comprises at least one frame element extending substantially perpendicularly from the first and/or the second plate.

5. The aircraft according to claim 1, wherein the first plate and/or the second plate is formed by a foil.

6. The aircraft according to claim 1, wherein the entire outer face of the insulating element is formed by the outer face of a plurality of plates.

7. The aircraft according to claim 1, wherein the first plate and/or the second plate comprise(s) a plurality of material layers disposed one above the other.

8. The aircraft according to claim 1, wherein the first plate and/or the second plate has/have an outer face which reflects heat radiation.

9. The aircraft according to claim 1, wherein the outer face of the first plate and/or the second plate is provided with a surface structure.

10. The aircraft according to claim 1, wherein the first plate and/or the second plate consist(s) of steel, a carbon fibre material, a plastics material, aluminum or titanium.

11. The aircraft according to claim 1, wherein an insulating material is applied to the first plate and/or the second plate and/or the frame structure.

12. The aircraft according to claim 1, further comprising a plurality of vent openings.

13. The according to claim 1, wherein the projecting edge portion extends substantially parallel to an adjacent plate of the insulating element.

14. The aircraft according to claim 1, wherein the insulating element enables the frame structure and/or the first plate and/or the second plate to be cooled on both sides through free convection.

15. The aircraft according to claim 1, wherein the insulating element comprises a plurality of plates disposed one above the other, wherein the plates can consist of the same material or of different materials.

16. The aircraft according to claim 1, wherein the cavity is void of any insulating materials that can absorb fluids, such as fiber or foam insulation.

17. The aircraft according to claim 1, wherein the first and second plates are formed from steel.

18. The aircraft according to claim 1, wherein at least one of the first and second plates includes a knob-shaped surface structure for augmenting scattering of heat radiation.

19. Thermal insulating system with a plurality of insulating elements comprising at least first and second insulating elements configured to thermally insulate a device, each insulating element comprising:

a first plate forming at least a part of an outer face of the insulating element;

a second plate forming a further part of the outer face of the insulating element;

a frame structure coupled to the first plate and the second plate, the frame structure including a plurality of frame elements establishing a geometry of the insulating element and coupled to one another to define a closed circumferential surface between the first plate and the second plate, wherein the first plate, the second plate, and the frame structure collectively define a cavity filled with air;

at least one vent opening formed in one or more of the first plate, the second plate, and the frame structure; and a projecting edge portion formed along an edge of a portion of the insulating element which is provided with the at least one vent opening, the projecting edge portion being adapted to at least partially cover a gap between two insulating elements disposed side by side, wherein the first and second insulating elements are spaced from one another by the gap and oriented such that the at least one vent opening of each of the first and second insulating elements are in fluid communication with one another and the gap, the at least one vent opening of each of the first and second insulating elements also communicating with the respective cavities filled with air so as to provide free convection by air exchange through the at least one vent opening and the gap when the air in the cavities is heated by the device thermally insulated by the thermal insulating element.

20. An aircraft including a thermal insulating element, the thermal insulating element comprising:

a first plate forming at least a part of an outer face of the insulating element;

a second plate forming a further part of the outer face of the insulating element;

a frame structure coupled to the first plate and the second plate, the frame structure including a plurality of frame elements establishing a geometry of the insulating element and coupled to one another to define a closed circumferential surface between the first plate and the second plate, wherein the first plate, the second plate, and the frame structure collectively define a cavity filled with air;

at least one vent opening formed in one or more of the first plate, the second plate, and the frame structure; and a projecting edge portion formed along an edge of a portion of the insulating element which is provided with the at least one vent opening, the projecting edge portion being adapted to at least partially cover a gap between two insulating elements disposed side by side in the aircraft, wherein the insulating element comprises a plurality of plates disposed one above the other, wherein the plates can consist of the same material or of different materials, and wherein the plurality of plates are spaced from each other so as to divide the cavity into parallel chambers between adjacent plates.

* * * * *

UNITED STATES PATENT AND TRADEMARK OFFICE
CERTIFICATE OF CORRECTION

Page 1 of 1

PATENT NO.         : 8,079,194 B2
APPLICATION NO.    : 11/951859
DATED              : December 20, 2011
INVENTOR(S)        : Markus Piesker It is certified that error appears in the above-identified patent and that said Letters Patent is hereby corrected as shown below:

ON THE TITLE PAGE:

Item (75), line 1: Inventor's city of residence "Lueneberg" should read --Lueneburg--.

Signed and Sealed this
Fourteenth Day of February, 2012

David J. Kappos
*Director of the United States Patent and Trademark Office*